May 3, 1966 R. A. HIGONNET ETAL 3,249,028

HIGH SPEED PHOTORECORDER

Filed March 30, 1964 4 Sheets-Sheet 1

INVENTORS
RENE A. HIGONNET
LOUIS M. MOYROUD

HIGH SPEED PHOTORECORDER

*INVENTORS*
RENE A. HIGONNET
LOUIS M. MOYROUD

HIGH SPEED PHOTORECORDER

Filed March 30, 1964 4 Sheets-Sheet 3

INVENTORS
RENE A. HIGONNET
LOUIS M. MOYROUD

INVENTORS
RENE A. HIGONNET
LOUIS M. MOYROUD

1

3,249,028

HIGH SPEED PHOTORECORDER

Rene A. Higonnet, Cambridge, and Louis M. Moyroud, West Medford, Mass. (% Photon Inc., 355 Middlesex Ave., Wilmington, Mass.)

Filed Mar. 30, 1964, Ser. No. 355,859
Claims priority, application Great Britain, Apr. 1, 1963, 12,910/63
16 Claims. (Cl. 95—4.5)

This invention relates to high speed display devices and recorders for the rapid recording of lines of characters by photographic, electrophotographic or similar means.

Recently, the photo-flash industry has made substantial advancements in the area of high speed recovery time photo-flash units. The present invention utilizes those advancements to permit high speed recording of lines of characters. The need for such a high speed recording device will become apparent when we consider the new advancements in the computer field especially in the high speed read-out devices. Lines of type need not be composed directly from a keyboard, but may be stored in memory storage and read-out at very much higher speeds than keyboard composition, thus creating a need for high speed display and recording devices commensurate with this new increased read-out speed.

Mechanical high speed printers have serious speed limitations, produce copy of mediocre quality and are generally restricted to one fixed alphanumeric alphabet.

Other recorders involving the use of electronic image formation means and cathode ray tubes can attain high speed but are very expensive and have also the range and quality limitations of mechanical printers.

It is an object of the present invention to provide a high speed recorder of simple construction which can attain speeds of over 100 lines per second.

Another object of this invention is the provision, in a high speed photographic recorder, of interchangeable character matrices for the selection of various type faces.

It is another object of this invention to provide an optical recorder producing lines of alphanumeric characters on a continuously moving light-sensitive medium.

Another object of this invention is to provide a high speed recorder including means to increase or decrease the number of different letters and symbols to be recorded by a simple adjustment of the device and a change of matrix.

Another important object of the present invention is to provide a high speed recorder including a continuously rotating character matrix with means to produce a number of identical characters in different columns in a line of text from the same master character.

Other objects and many of the advantages of this invention will be readily appreciated by reference to the following description taken in conjunction with the accompanying drawings, in which FIG. 1 shows in diagrammatic form the optical arrangement of the apparatus embodying the present invention;

2

Figures 4, 5:
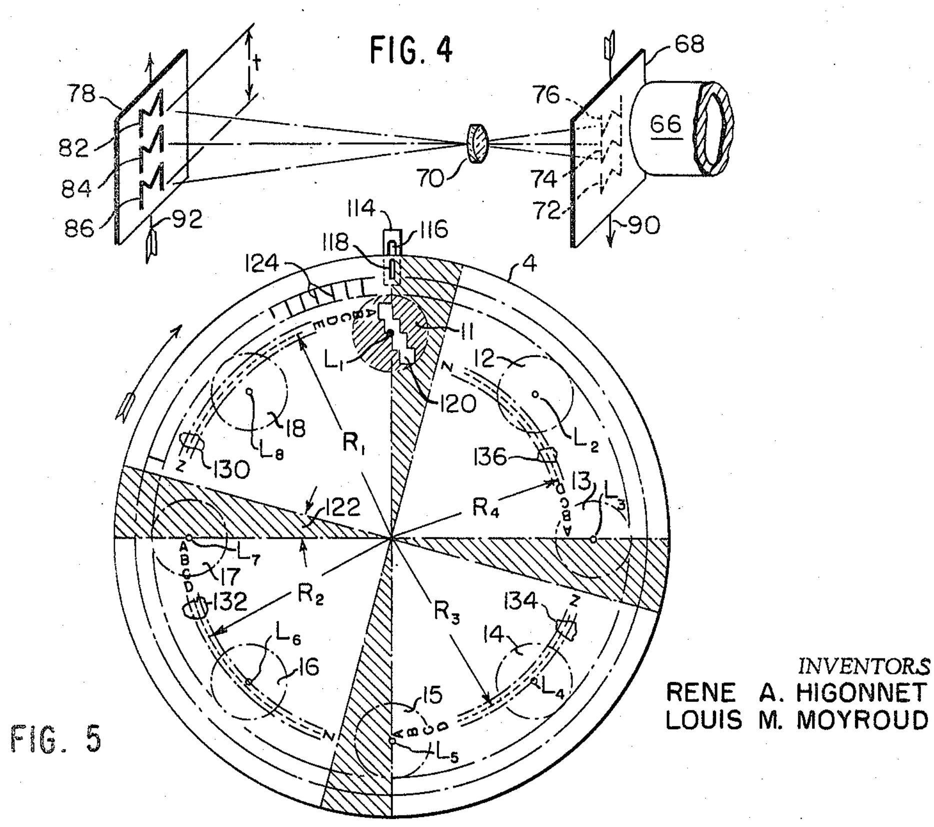
FIG. 4 is a diagram illustrating the compensation means used to project continuously moving character images onto a continuously moving film.
FIG. 5 represents the matrix disk of one embodiment of the present invention.
Figure 8:
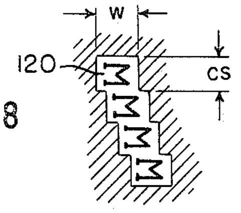

FIG. 8 is a detailed view of a portion of FIG. 5.

Figure 9:
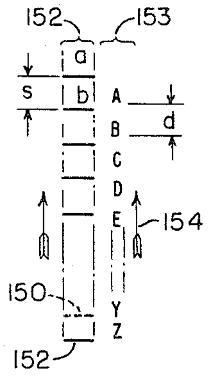
Figure 10:
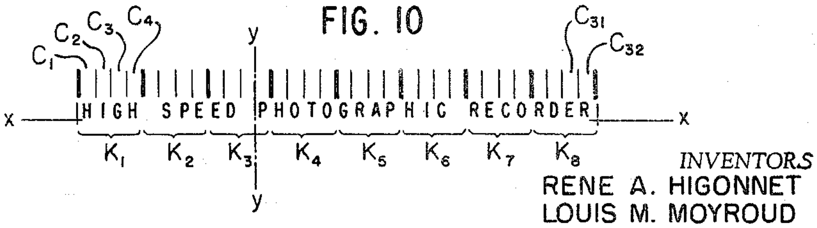
Figure 11:
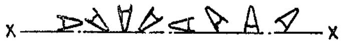
Figure 12:
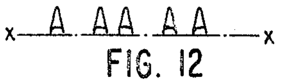
Figure 13:
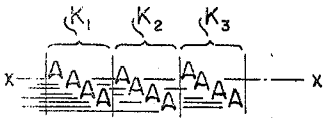
Figure 14:
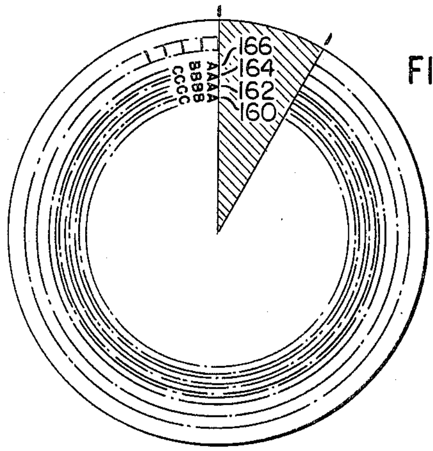
Figure 15:
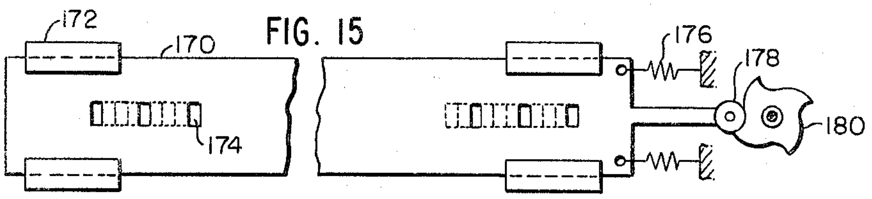
Figure 16:
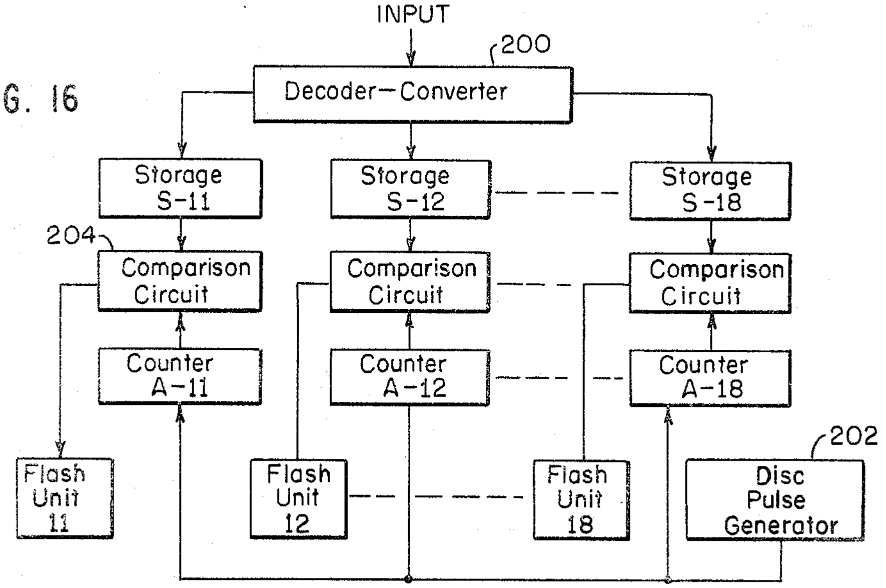
Figure 17:
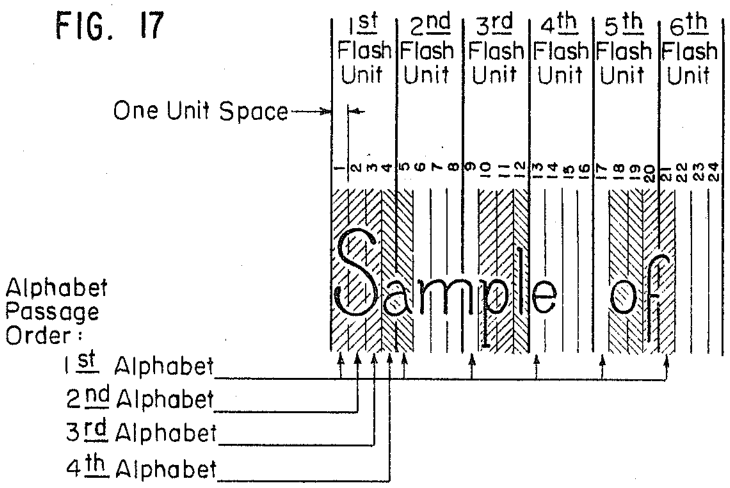

FIG. 9 is a diagram representing the relative position of master characters and associated controlling flash slits;

FIG. 10 represents the elements of a line for text matter which can be composed by the machine embodying the invention;

FIGS. 11 and 12 represent the location of typical character images on a reference screen during the initial adjustment of the optics of the machine;

FIG. 13 represents a portion of a line of the same characters as it would appear on the film if no compensation for continuous motion were utilized;

FIG. 14 represents a matrix disk of large capacity;

FIG. 15 is a diagrammatic view of a shutter used in one embodiment of the invention;

FIG. 16 is a block diagram of one of the control circuits which may be utilized to time character image projections in a device embodying the present invention;

FIG. 17 is a diagram representing a line of characters of different widths; and

Figure 18:
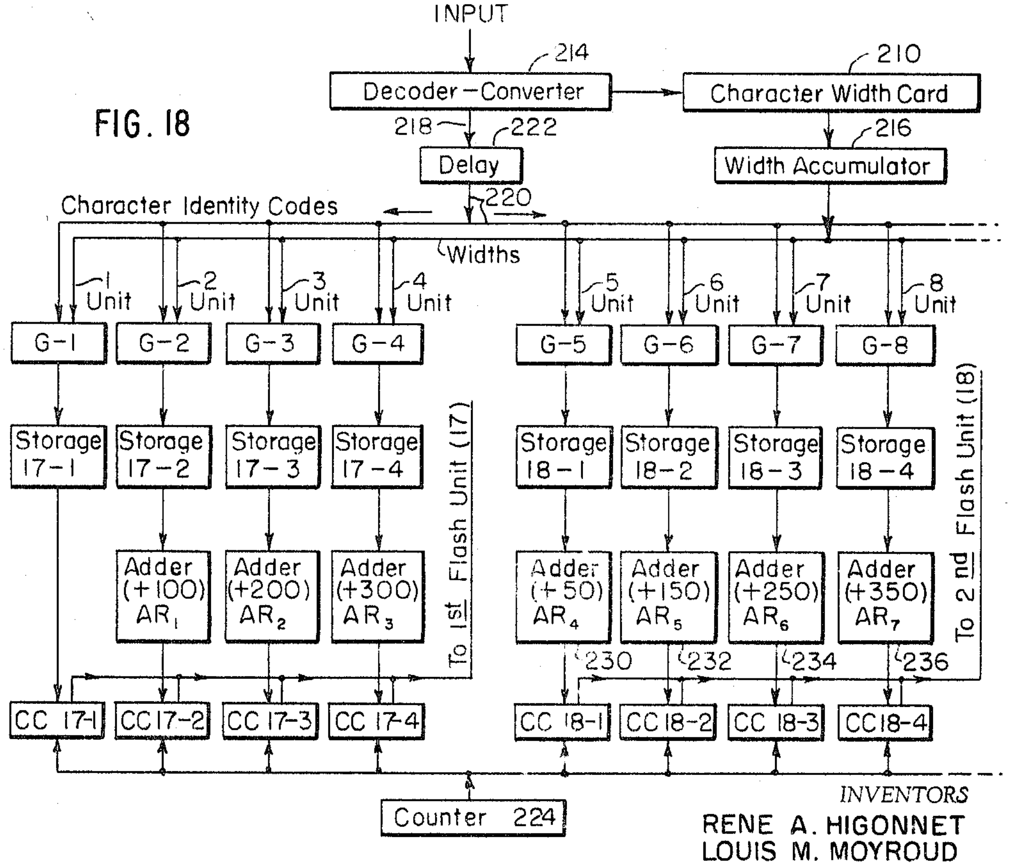

FIG. 18 is a block diagram of the circuit controlling the recorder.

In the preferred embodiment of the invention which will now be described, master characters, transparent on opaque backgrounds, are located on a matrix disk 4 (FIG. 1) in a circle or segments of circles 8. The matrix disk is preferably easily removable and is similar to matrix discs utilized in the photographic type composing machines commercially known as Photon. The matrix disk rotates continuously and characters are projected onto a photographic film by a flash of short duration basically as explained in our Patents Nos. 2,790,362 and 2,999,434.

Figure 1:
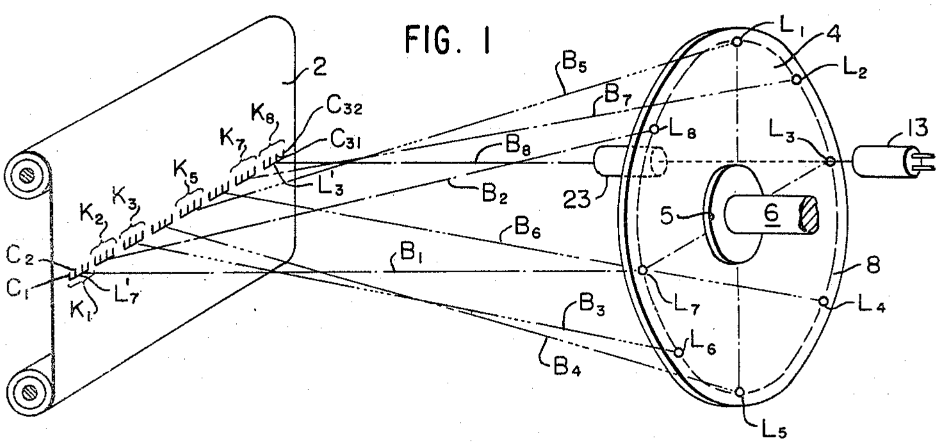
Figure 2:
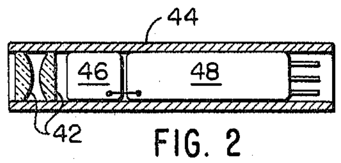
FIG. 2 represents one of the flash units of the recorder.
Figure 3:
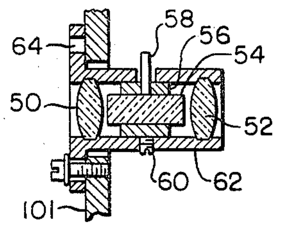
FIG. 3 represents one of the optical projection units of the recorder.

In the present machine, however, each revolution of the matrix disk does not produce only one character as explained in the above-mentioned patents, but, generally, a whole line of characters. The characters of the matrix disk are preferably oriented as shown in FIG. 5, with the base of each character along a radius of the matrix. These characters are preferably of the styles commonly used in typewriters. They can comprise roman, bold and italic characters of all the same basic width or of so-called "proportional width." A film 2 (or other light responsive surface) in FIG. 1 is located in a plane parallel to the plane of matrix 4 and at the appropriate distance so that an optical unit 23 will make an image of a point L3 at location L'3 on the film. In the embodiment shown there is provided, regularly spaced around the periphery of the disk, eight such points as L3 designated by L1, L2, . . . L7 and L8. It is assumed now that each of these points represent the central point of a character of the disk. On the opposite side of the disk in relation to the optical units are located a series of flash units such as 13. There is one flash unit and one optical unit associated with each of the eight points generally designated by L mentioned above. In the embodiment now being described, each flash unit such as 13 can produce four flashes during one revolution of the matrix disk to project onto the film four characters such as C1, C2, C3, C4, representing a group K1 associated with point L7 on the matrix. The means utilized to project these characters successively in four different columns will be explained later. Each flash unit as shown in FIG. 2, includes an electronic circuit 48 comprising triggering circuits and discharge condensers, a flash lamp 46 of a commercially available type, and an optical condenser 42. These components are located in a common shield 44. Each flash unit is connected to the electronic controlling circuit of the machine which will not be described in detail as it is well known in the art. Each optical projection unit, as shown in FIG. 3 includes a first collimating lens 52 located at a distance from the matrix approximately equal to its focal length, a dove prism (or equivalent) 54 through which parallel bundles of light emerging from lens 52 pass to reach lens 50 approximately located at a distance from film 2 equal to its focal length so that the character images reaching said film are in sharp focus. Returning now to FIG. 1, each point generally designated by L is connected to a conjugate points generally designated by L′ on film 2 by lines B1, B2, B3, . . . B6, B7 and B8. The location of points L′ on the surface of the film is determined by the number of columns or character positions associated with each optical system of the machine and by the spacing of these columns on the film. In the example shown in FIG. 1 there is provided, for the projection of a 32 character-line in one revolution of matrix disk, eight flash units and optical systems. Each optical system is located on a line B between the matrix and the film and each flash unit is located on the same line B on the other side of the matrix disk. Returning now to FIG. 3, it is shown that each dove prism 54 is mounted in a holder 56 rotatably secured inside the tubular section of mount 62. Adjustment is obtained by moving a finger 58 protruding through a slot managed in mount 62, in order to rotate the prism and thus obtain proper orientation of character images on the film. After proper adjustment is made the dove prism unit is secured by a set screw 60. Mount 62 is provided with a flange for attachment to the base of the machine. By slidably positioning each optical unit in a direction perpendicular to the axis of said unit on surface 101 of the frame of the machine and correctly positioning its dove prism it is possible to bring any of the characters located around the periphery of the matrix in the proper orientation and flush with the base of the line to compose.

Figure 6:
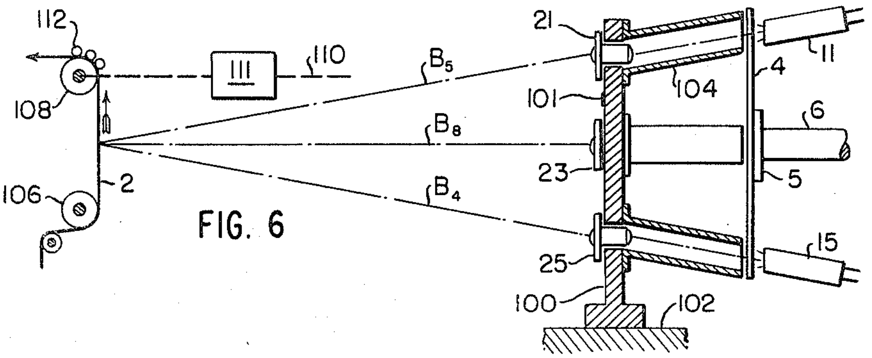
FIG. 6 is a simplified elevation view, partially in cross section, of a machine embodying the present invention.
Figure 7:
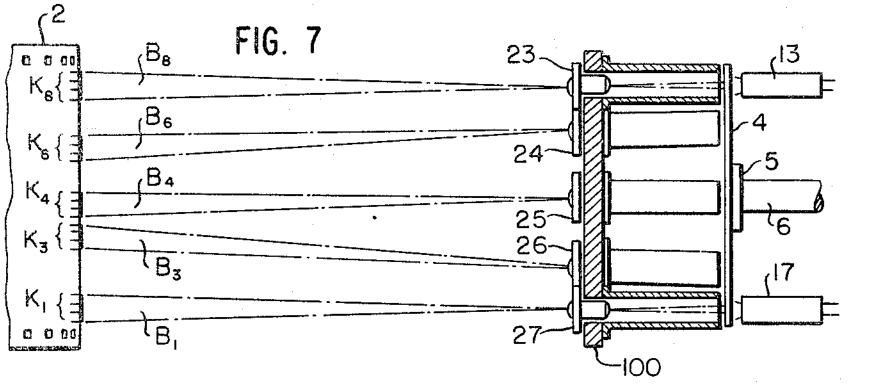
FIG. 7 is a plan view, partially in cross section, of the same machine.

In order to better understand one of the principles used in the present invention, reference is made to FIG. 5 where one of the matrix disks which can be used in the present embodiment is shown. In this figure the disk is shown at 4 and continuously rotates around point 0. In this example four identical alphabets are provided at 130, 132, 134 and 136. Each of these alphabets is located on a circle segment of different radius. The difference between radius R1 of segment 130 and radius R2 of segment 132 is proportional to the spacing between two consecutive characters in a line on the film. This proportion depends on the enlargement or reduction ratio of the optical system. The difference between radius R2 of segment 132 and radius R3 of segment 134 is the same as well as the difference between the radii of segments 134 and 136. The flash units are schematically shown at 11, 12, 13, . . . 17, and 18. Each of these units should illuminate an area at least as large as the shaded area shown in relation with flash unit 11. This is necessary as the same flash unit will generally be operated four times for each revolution of the matrix disk. In order to leave sufficient time for these flash unit circuits to be reconditioned in case, for example, where the last character of segment 130 is to be flashed succeeded by the first character of following segment 132, a dead zone or recharge zone 122 devoid of characters is purovided between each circle segment. Flash timing is obtained by a circuit involving photoelectric pulses generated by transparent slits 124 provided around the disk as explained in our Patent No. 2,790,361. A master slit 118 cooperates with an opening 116 in a shield 114 to generate a signal each time the disk starts a new revolution. The controlling slits 124 cooperate with an exciter lamp and preferably an optical system so that these slits produce controlling pulses as they pass by aperture 116 of window 114. As shown in FIG. 5, central points L are approximately located half way between the outermost segment 130 and the innermost segment 136, in a radial direction. As the disk rotates, the first character of the group of columns $K_1$ is projected during the first quarter revolution of the disk, then the second character of the group $K_1$ is projected during the second quarter revolution, then the third character, and so on. It should be evident at this point that the number of segments is quite flexible as it depends on the desired speed and the number of different characters to mix in a line. A single circle of characters could be used which would provide for a larger choice of various characters or, conversely, a larger number of segments would enable a higher speed as more than four characters could be projetced for each revolution of the matrix disk. Returning now to FIGS. 6 and 7 where the machine is represented in less schematic form than in FIG. 1, the same lines and the same elements can be recognized, identified by the same reference numbers. The disk 4 is attached to a flange 5 of a continuously rotating shaft 6. The optical units 21, . . . 27, 28, are secured to frame 100 attached to base 102 of the machine. Light shields such as 104 are provided between each optical unit and associated exposure position of the matrix in order to confine the light emerging from the associated flash unit. As seen in FIGS. 6 and 7, large holes are provided in frame 100 to accommodate the cylindrical portion of each optical unit of FIG. 3. There is sufficient clearance left between said cylindrical portion and the diameter of the hole to provide for adjustment of each optical unit in a plane parallel to the plane of face 101 of frame 100. In order to make this adjustment possible small eccentric studs, not shown, can be used. The holes 64 provided in the flange of each optical unit (FIG. 3) are bigger than the attaching screws, a washer being used to positively secure each unit after adjustment. In order to adjust each unit, film 2 can be replaced by a screen on which a base line such as XX (FIG. 10) has been scribed as well as column lines such as YY.

In order to, for example, align optical unit 21 associated with flash unit 11, point L1 on the disk, line B5 and character group K5 (FIG. 5) (see also FIGS. 1 and 10), the control circuit is set up to continuously flash the first character, for example "A" of the first segment 130 of the disk and location of the first character of group K5 shown at C17 in FIG. 10, is identified by scribed lines on the adjusting screen. The first operation is to move optical unit 21 against the surface 101 of frame 100 until the corresponding character "A" appears on the screen, for example, as shown by the first character to the left of FIG. 11. Then, dove prism 54 is rotated by moving finger 58 (FIG. 3) until the letter "A" is sitting properly on base line XX as shown in FIG. 12. Final adjustment is made by relocating the optical unit by a slight displacement and if necessary by a new smaller rotation of the dove prism in order to center the character in column C17 and set it on the base line. The purpose of an image rotating optical device such as a dove prism should be well understood at this point and FIG. 11 represents what the orientation of the same character "A" would be if no such image rotating device were used. This figure represents the orientation of the image of the same master character of the disk as it would be successively produced by the eight flash units associated with the disk if the dove prism were omitted. Final adjustment brings each character not only adjacent to base line XX but also at the center of each column as represented by scribe vertical lines XX as shown in FIG. 10. This is also obtained by sliding each optical assembly against surface 101 as explained above.

FIGS. 7 and 10 show clearly how different elements of the line to compose are formed by the different projection units. In the projection of the line "HIGH SPEED PHOTOGRAPHIC RECORDER" optical unit 27 projects successively letters H, I, G and H, of group K1 while projection unit 26 projects successively letters E, D, of group K3 and projection unit B4 letters H, O, T, O, of group K4, etc.

In one embodiment of the invention, matrix disk 4 makes one full revolution to project all the characters of one line on a stationary film, which is moved longitudinally for line spacing after the completion of each disk revolution for complete alphabet passage. In a preferred embodiment of the invention, however, in order to achieve high speed and do away with the start-stop mechanical limitation of a film feed mechanism, this film is moved continuously past an aperture, or window, through which all the characters of the line are projected. It is evident that in this case some compensation means must be used to keep all projected characters in alignment on the base line as both film and matrix are moving at the time flashes are produced. If, for example, a line of Cap "A's" were to be composed, and no compensation means were used, the line would appear on the film as shown in FIG. 13. The alignment of characters on the same base line is obtained according to one feature of the invention, by properly controlling the flash timing units. The relative displacement of master character and projected image is schematically shown in FIG. 4. In this figure the flash unit is shown at 66, the matrix 68 is continuously moving in the direction of arrow 90, and a fixed projection lens 70 makes an image of illuminated characters onto film 78 which is continuously moving at a uniform speed in the direction of arrow 92. Assuming that letter "M" is to be flashed and that the flash can occur at a controlled time during the passage of the master character in front of the flash unit, it can be seen that if the flash occurs when the master character is at location 76 its image will hit the film at location 86, if the flash occurs when the master character is in the central position 74, its image will be made on the film at location 84, and finally if the flash occurs when the master character is approaching the end of the projection window at position 72, its image will hit the film at location 82. The film motion can thus be compensated for by timing the flash so that an early character is flashed relatively late and a late character of the sequence is flashed relatively early. For example, character "M" will be flashed by flash unit 11 when letter "M" of the first segment 130 reaches level 76 and the letter "M" of the last segment 136 will be flashed by the same flash unit 11 at level 72, and it is clear by looking at FIG. 4, that although the film has moved up a distance *t* between these two projections, both letters will be aligned on the same base line. Actually in the case of the figure as the segments are shown on the same circle, these two characters would actually be superposed on the film.

According to another feature of the present invention, the proper amount of timing compensation for continuous film feed is obtained by properly spacing the slits 124 of FIG. 5 as shown in more detail in FIG. 9. In this figure the flash controlling slits are shown at 152, and the alphabet at 153. The control slits are spaced by a distance "*s*" and the letters of the alphabet are spaced by a distance "*d*." Compensation for film motion is automatically obtained by making distance "*s*" slightly larger than distance "*d*," difference depending on several factors among which the rotational speed of the disk, the speed of the film, etc. The slit controlling the flash of character "A" is shown at 152–*a*, the slit controlling character "B" is shown at 152–*b*, etc. It can be seen that there is a gradual decreasing distance between the base line of succeeding characters in their controlling slits. For example, the last character of the alphabet "Z" is, in the example shown, at the same level as its controlling slit 152–*z*. The same slit would be located at 150 if the slit spacing were the same as character spacing. It is apparent from what has been explained that as the alphabet and slits move in the direction of arrow 154, the first character of the sequence "A" will be flashed relatively earlier (with reference to a fixed location) than the last character of the sequence: "Z." The difference in flash timing between "A" and "Z" is represented by the time the disk takes to travel the distance between 152 and the location of fictive slit 150. As shown in FIG. 5 the window through which characters are illuminated is preferably shaped so that the character images can be projected no sooner than the segment of the first character and no later than the last character of each individual segment. "W" represents the maximum character height plus the image displacement during approximately one-quarter revolution of the matrix disk. Dimension "CS" is proportional to the column width or character spacing on the film.

It has been found experimentally that commercially available flash lamps giving flashes of approximately one microsecond duration can be operated at the rate of 1,000 flashes per second with a light output more than sufficient to produce well defined characters of high density on the film. The following values could be used in a machine embodying the present invention: Four hundred character locations provided on a disk of an outside diameter of 12 inches, with four segments each containing 88 characters of four-point size. Characters spaced two millimeters apart and the outermost segment located at approximately five inches from the center of the disk. With an enlargement ratio of three, 12-point characters are produced on the film. By locating flashing unit and associated projection unit every 18 degrees around the periphery of the matrix it is possible to accommodate twenty such units and thus produce 80 character lines. Dead zones corresponding to 12 character positions are provided between each segment. By rotating the disk twenty revolutions per second the machine produces twenty lines per second with a maximum of 80 columns per line and a choice of 88 different characters. At this speed the dead zone represents a passage time of 1.5 milliseconds which has been found quite sufficient to recharge the flash circuit. The film is moving continuously at a speed of 100 millimeters per second to space lines by approximately 4.9 millimeters. The relative displacement to compensate for the motion of the film is approximately .4 millimeter between the first and the last character slits of a segment.

The matrix disk as used in the machine embodying the present invention is easy to manufacture and can be quickly replaced. Characters and slits are preferably photographed simultaneously in a manner similar to the one described in our Patent No. 2,715,862. In the matrix where the slits are gradually displaced in relationship with the base of associated characters, in order to compensate for film motion, said slits are preferably located on the same master sheet as individual master characters. In this way, a very high precision can be obtained in the relative location of slits and characters.

It is one of the features of the invention to provide for a matrix disk containing the large number of different characters or symbols. In the embodiment described above, each alphabet contains 88 different characters which is generally enough to accommodate, in addition to upper and lower case and numerals a relatively large number of punctuation marks, diacritical marks and common mathematical symbols. In the case where an even larger choice of characters is desired, for example, to compose text containing different fonts and mathematical symbols, a disk as represented in FIG. 14 can be substituted to the disk of FIG. 5. The disk shown in FIG. 14 contains four different circles of characters shown at 160, 162, 164 and 166. Each circle may contain 380 different characters which may include roman, bold, italics, and mathematics. Each circle contains the same number of identical characters as each of these circles is associated with a given column as described above. In this case where a larger selection of various characters is desired the speed of the machine is preferably slowed down and in the example shown, it is assumed that the matrix will make four complete revolutions for the composition of a full line of characters on the film. In the example of FIG. 14, the first revolution of the matrix produces the first character of each group K (FIGS. 1, 7 and 12), the second revolution produces the second character of each group K, and so on. As during the first revolution each flash lamp would project onto the film not only one character, but four identical characters corresponding to a complete group K, shutter means as shown in FIG. 15 are utilized to confine the exposure to no more than one character column. This is achieved by locating adjacent to the surface of the film a shutter 170 provided with apertures 174 of the width of a column and a height sufficient to accommodate the projection displacement for compensating film motion. Slides 172 enable shutter 170 to be moved longitudinally in order to shift apertures 174 one column width following each disk revolution. Shutter 170 is provided with a roller 178 maintained in contact with cam 180 by the action of springs 176. Cam 180 is rotating at one-quarter of the speed of the matrix disk and is provided with steps so that for each full revolution of the matrix disk said cam rotates by one-quarter of a revolution. During the passage of the dead zone 22 opposite the controlling slit of the device, the shutter 170 is moved from one position to the next by a steep ramp of said cam. The leading is, of course, not continuous in this case, but rather takes place at the end of each four disk revolutions, for example, during one additional "idle" revolution.

The speed of the machine can be considerably increased by increasing the number of flash units and decreasing the number of different characters around the disk. Speeds of more than 500 lines per second are possible with the proper arrangement of flash units, optical units, and character circles.

Various means can be utilized to electronically control the flash timing of the various flash units during one revolution of the matrix disk. A preferred embodiment is diagrammatically shown in FIG. 16 which is similar to the flash control system described in our Patent No. 2,790,362. The input to the electronic controlling circuits may be obtained from a magnetic or paper tape reader or directly from a computer. Character codes are converted in a decoder converter shown at 200. The purpose of this converter is to represent each character by a binary number which is transferred to the different storage units shown at S11, S12 . . . S18. There is preferably one storage unit for each flash unit of the machine and each alphabet on the disk. Each storage unit is connected to a comparison circuit such as 204. As the disk rotates it generates pulses iin generator 202 which are transferred to counters A11, A12, . . . A18. Each of these counters is associated with a flash unit. When the count stored in these counters is equal to the count in storages generally designated by S, a trigger pulse is sent to the corresponding flash unit and the proper character is projected onto the film. The stored "character count" is corrected by addition or subtraction of pulses to take into account the location of each flashing unit and alphabet, as described below.

In order to illustrate the operation of the system in the case where proportional space characters (based on four units to the Em) are used, let us consider the sequence of events which will lead to the composition of the word "Sample," in which "S" is three units wide; "a" is two units wide; "*m*" is four units wide; "*p*" is two units wide; "*l*" is one unit wide and "*e*" is two units wide. (See FIGS. 17 and 18.)

The "loading" of the circuit (generally from magnetic tape) takes place preferably one line at a time. During this operation, the width of each character is recognized by the use, for example, of style cards 210 such as described in our co-pending application Serial No. 741,209. These widths, in units, are accumulated in an accumulator which, for each unit increment switches the output from a wire to another and open successively associated gates G–1, G–2, G–3, etc. (FIG. 18). In the case of the example, "S" being three-unit, its alphabetical identity code will be channelled to the third storage

17–3 associated with the first flashing unit 17 (FIG. 5). The addition of the width of "*a*," two units, to the previous three units shifts the output to the circuit of the second flashing unit 18, through gate G–5. So the code of "*a*" is stored in the first storage 18–1 associated with the second flashing unit 18. Now "*m*" is loaded, which is four units wide. The addition of this width to the previous total of five increases the accumulated value to nine which is beyond the scope of the second flash unit (from 5 to 8). Consequently, the alphabetical code of "*m*" is stored in the first storage (not shown) associated with the third flashing unit. The next character, "*p*" is two units wide. Its width will move the accumulated width to eleven, which is still within the scope of the third flash unit (9 to 12). Thus, the code of "*p*" will be stored in the second storage associated with the third flashing unit. The next character "*l*" being only one unit wide will also be associated with the third flash unit and will be stored in the third storage of this unit.

The control circuit as shown schematically in FIG. 16 applies to disks having only one alphabet per circle. In the case of disks having 4 alphabets per circle as shown in FIG. 5, there must be four storages such as S–11 per flashing unit, one storage per alphabet. A single comparison circuit, however, can be utilized. This circuit continually compares the value shown in the counter to the four values stored in the "alphabet" storages. The flash unit attached to this particular circuit is operated for each coincidence.

Although it has been assumed so far in the description that the characters of the matrix disk are of a uniform width, it is possible, without leaving the scope of the invention, to utilize so-called "proportional space" characters. For example, the alphabet can be based on four different width units so that the "M" is four units, the "*c*" is one unit, the "*a*" two units, In this particular case, the difference between the length of the radii R1, R2, R3, etc. of FIG. 5 are not proportional to the so-called "column spacing" or the fixed widths of non-proportional spacing characters, but said difference between radii are proportional to one quarter of the widest character of the alphabet, or one "width unit." In this case, of course, assuming that the rest of the system remains as described, the number of characters projected by each flash unit during one revolution of the disk will vary with the width of said characters. If, for example, four "*i*" have to be projected at K1 (FIG. 1) by flash unit 17, said unit will be operated four times during one revolution of the disk to protect said four "*i*" of group K1. If "M" had to be projected at the same location, said flash unit would be operated only once during one revolution of the matrix.

In the case of proportional space characters, the width (in units) of these characters has to be taken into account in order to select which characters are to be flashed by any flashing unit.

The circuits associated with the first two flashing units only have been shown in the block diagram of FIG. 18. It should be understood that "first flashing unit" means the flash unit associated with the optical system positioned so that it projects any character within the first four unit spaces (K1 in FIGS. 1 and 10) at the beginning of the line. "Second flashing unit," likewise, relates to the flashing unit associated with the optical system to which the second group of four unit spaces have been allocated, and so on. These flashing units are represented at 17 and 18 in the drawings, FIGS. 5 and 7.

In FIG. 18, the information pertaining to a line is fed to a decoder-converter which identifies characters and recodes them to a code compatible with the system utilized to time the flashing units of the machine. In the case of the example, each character is identified by a code representing in binary notation the number of character-locations on the disk to be counted between the zero or datum slit 118 (FIG. 5) and said character. As the characters are decoded in block 214 (FIG. 18), their widths are determined by a wired table on style card 210. These widths are accumulated in accumulator 216 which controls gates G–1; G–2; . . . G–32. In the example shown, there are as many gates as there may be units of width in the line, one gate for each unit. There is, at any time during the loading of the line, one gate only open, through which the identity code appearing on wires 220 can reach one of the storages 17–1; 17–2; etc. There is also one storage for each gate "G." The identity code input is slightly delayed by delay circuit 222 so that the gate selected by the accumulator 216 is certainly open prior to the appearance of the identity code on wires 220.

As explained before, the passage of slit 118 in front of window 116 (FIG. 5) causes a new counting cycle to start. From this moment one pulse is sent to a counter each time a character slit 124 crosses said window 116. In this way, the location of each character, at any time during the rotation of the disk is determined by the number of slits counted, in a manner well known in the art.

Each character of each alphabet is identified as mentioned above, by a coded number representing, for example, the location of this character from the first character of said alphabet. In the case of FIG. 5 where four identical alphabet (or segments) are located around the matrix disk, it is necessary to further distinguish between the same character of different alphabets. Assuming that there are 100 character positions in each quadrant of the disk, the same character represented by a number "$n$" in alphabet (or segment) 132 will be represented by $n+100$ in alphabet 134; by $n+200$ in alphabet 136 and by $n+300$ in alphabet 130. Further assumption is made that flash unit 17 is associated with the first characters of the line. This "correction" is obtained, as shown in the block diagram of FIG. 18, by the use of an adding circuit (and register) associated with each storage. The purpose of these adding circuits is not only to discriminate between the various identical alphabets of the disk, but also to discriminate between various flash units as the location of said units, around the disk, necessitates a correction in the number of pulses to be counted before flashing a character. For example, in FIG. 5, it is clear that if letter "A" of alphabet 132 is to be projected at the beginning of line to compose, the code of said letter A being "one," meaning that at count "one" said letter will be flashed by flashing unit 17, the same letter A, if it is to be projected by flashing unit 18 must travel the angular distance between flashing units 17 and 18. In the example of the figure, eight flashing units are equally spaced around the disk, which leaves 50 character positions between flashing units, if we assume that there are 400 character positions around the disk. Thus, the same letter A of alphabet 132, if it is to be flashed by flashing unit 18 will be represented by code number "51," which means that 51 pulses will be counted from the beginning of the count until said letter will be aligned with flashing unit 18 during the rotation of the disk. The "correction" depending on the location of each flashing unit is obtained by adding a fixed value for a given flashing unit to each character code, as shown in FIG. 18, at AR4, AR5, AR6 and AR7.

One hundred units will be added to each character code associated with flashing unit 11, one hundred and fifty to each character associated with flashing unit 12, etc. However, as at no time, the "pulse count" must exceed 400, which is the maximum capacity in character positions of the disk, the Adders of FIG. 18 are limited to a maximum capacity of 400 so that they represent the addition of character code values, plus a first correction for alphabet location plus a second correction for the location of the flashing unit minus "$n$" times 400, "$n$" being an integer.

As the disk rotates, counter 224, which falls back to zero as it reaches 400, continuously represents the angular location and the disk in relation with a datum line or window 116, and its value is continuously sent to comparison circuits CC–17–1; CC–17–2, etc. . . . As soon as one of these comparison circuits detects identity between the corrected character code as represented in one of the adder-registers AR and the number represented by the counter 224, a pulse is sent to the associated flashing unit to flash the character which, at this time, intersects the optical axis of the system of which said flashing unit is part.

Various other means can be utilized to time the proper flashing unit at the proper time. These could include magnetic drums, or magnetic core storages or "maps" and other means with which the man of the art is familiar.

The control circuit described in relation with a disk containing proportional width characters can also be utilized in a system where all characters are of the same width, with a minor alteration. This alteration consists in counting characters rather than "units" in accumulator 216 and removing character widths table 210.

A preferred form only of the optical system has been shown. It will be apparent to those skilled in the art that many variations utilizing mirrors and various kinds of prisms can be substituted to the optical units illustrated and described therein. In addition, these optical units can be positioned so that their optical axis is parallel to the associated projection line B. The small optical imperfections introduced by doing so are within acceptable tolerances. This arrangement makes it possible to use relatively inexpensive achromatic lenses.

It is within the scope of the present invention to replace the film 2 of FIG. 6 by other surfaces responsive to light. It is clear that any Xerographic or Electrophotographic unit can be utilized. The light sensitive surface is continuously driven by a shaft 110 preferably mechanically connected to shaft 6 of the matrix. The proper speed of the sensitive material is obtained by the use of speed reducing mechanism 111. This mechanism is preferably adjustable to accommodate different character sizes which can be obtained by changing the size of matrix characters or for the cases where the machine speed is decreased by the utilization of a matrix of larger capacity or increased by the use of a matrix of fewer characters.

Instead of being arranged as shown in FIG. 5, the characters on the master disk can be positioned so that their base line is perpendicular to disk radii instead of tangent to them. In this case the multiplicity of columns can be obtained by differentially spacing the control slits. In such an arrangement the film is preferably left stationary during the projection of a line although some optical compensation means may be utilized to keep the film in motion during the flashing of character images.

The optical system disclosed in the present invention can also be utilized in a character recognition device. In such an arrangement a line to be read or recognized would be placed at the same location as the light sensitive surface and photo-cells would replace the flash units.

Having thus described my invention, I claim:

1. Photographic type composing apparatus comprising the combination of a continuously rotating matrix bearing a plurality of alphabets of characters to be projected, each arranged along a circular arc having its center in the axis of rotation, each alphabet being located on a different radius; a system of fixed projection lens assemblies each including image rotation means for the alphabet characters to be projected; means to support a sensitized sheet in position to receive images of characters formed by said projection lens assemblies; a fixed light source for each projection lens assembly in position to illuminate a character in the vicinity of a fixed line through the center of said light source and through the axis of its corresponding lens assembly thereby projecting the image of said character through said lens assembly upon said sensitized sheet.

2. Photographic type composing apparatus comprising the combination of a continuously rotating matrix bearing a plurality of alphabets of characters to be projected, each arragned along a circular arc having its center in the axis of rotation, each alphabet being located on a different radius; a system of fixed projection lens assemblies each including image rotation means for the alphabet characters to be projected; movable carriage to support a sensitized sheet moving continuously from line to line to receive images of characters formed by said projection lens assemblies; a fixed light source for each projection lens assembly in position to illuminate a character in the vicinity of a fixed line through the center of said light source and through the axis of its corresponding lens assembly thereby projecting the image of said character through said lens assembly upon said sensitized sheet.

3. Photographic type composing apparatus comprising the combination according to claim 2 together with a photo-electronic control of the flash timing thereby providing compensation for the continuous vertical motion of the sensitized sheet.

4. The combination according to claim 3 together with a shutter provided with apertures of the width of a character column and a height sufficient to accommodate the projection displacement for compensating film motion.

5. In photographic type composing apparatus with a continuously rotating matrix bearing a plurality of alphabets of characters to be projected, each alphabet being arranged along a circular arc having its center in the axis of rotation, each alphabet being located at a different radius from said axis, a system of fixed projection lens assemblies each including image rotation means for the alphabet characters to be projected such that the curvilinear motion of a character during its motion past a fixed projection lens assembly is optically transformed into rectilinear motion of the image with the base line of said character optically aligned with the base line of the line of characters to be composed.

6. The combination according to claim 4 including a means of compensation for continuous motion of the sensitized sheet by control of the flash timing through the use of controlling slits spaced by a distance "*s*" and the letters of the alphabet are spaced by a distance "*d*" compensation for the motion of the sensitized film being obtained by making "*s*" slightly larger than "*d*."

7. The combination according to claim 1, wherein the projection lens assemblies are arranged to permit each assembly to direct images to a separate character group of a common line of text to be composed.

8. The combination according to claim 7, each said character group including as many character images as there are circular arcs of characters on the character carrier.

9. The combination according to claim 8, the radial spacing of the circular arcs of characters on the character carrier being arranged to space the character images within each said character group into predetermined columns in said line of text.

10. In type composing apparatus, the combination of a continuously rotatable character carrier having thereon a plurality of circles of characters with centers in the axis of rotation, each circle having an alphabet of said characters, a support for a sensitized sheet, a plurality of fixed lenses each in position to focus upon said sheet an image of any character in any circle momentarily in the vicinity of its optical axis and having a flash device to illuminate briefly any character in said vicinity, and flash control means synchronized with the character carrier to operate each flash device at the precise instant when a selected character bears a predetermined relationship to the axis of the corresponding lens, the radii of said circles being related to cause the images of characters projectable by any lens to focus in a group of positions with predetermined spacing on a common line on said sheet.

11. The combination of claim 10 wherein the optical axes of the lenses are adjusted so that they focus adjacent groups of character positions on a common line.

12. The combination of claim 10 wherein the optical axes of the lenses are adjusted so that they focus adjacent groups of character positions on a common line, at least one of the lenses incorporating an image rotating element to align the character images projected thereby with the images projected by another lens.

13. The combination according to claim 10 with means to move the support intermittently for spacing lines of images on the sensitized sheet.

14. The combination according to claim 10 with means to move the support continuously transversely of the line on the sensitized sheet, the flash control means including provision to alter the instant of flash of a character as a function of the position thereof within a group.

15. The combination of claim 10, wherein the character images vary in set-wise width in multiples of a unit value and adjacent positions within each group of image positions are spaced by said unit value.

16. The combination of claim 10, wherein the character images are spaced by equal set-wise widths in each group.

References Cited by the Examiner

UNITED STATES PATENTS 3,134,090 5/1964 Blakely ------------ 340—147

JOHN M. HORAN, *Primary Examiner.*